Aug. 1, 1961 C. E. LOMAX 2,994,743

TWO HUNDRED TERMINAL PARTY LINE AND P.B.X CONNECTOR

Filed Dec. 31, 1959 3 Sheets-Sheet 1

INVENTOR.
CLARENCE E. LOMAX
BY C. A. Gulbrandsen
Att'y.

Aug. 1, 1961 C. E. LOMAX 2,994,743

TWO HUNDRED TERMINAL PARTY LINE AND P.B.X CONNECTOR

Filed Dec. 31, 1959 3 Sheets-Sheet 2

INVENTOR.
CLARENCE E. LOMAX
BY C. A. Gulbrandsen
Atty.

TWO HUNDRED TERMINAL PARTY LINE AND P.B.X CONNECTOR

Filed Dec. 31, 1959 3 Sheets-Sheet 3

INVENTOR.
CLARENCE E. LOMAX
BY
C. A. Gulbrandsen
Atty.

United States Patent Office 2,994,743 Patented Aug. 1, 1961

2,994,743

TWO HUNDRED TERMINAL PARTY LINE AND P.B.X CONNECTOR

Clarence E. Lomax, Hastings, Nebr., assignor to Automatic Electric Laboratories, Inc., a corporation of Delaware Filed Dec. 31, 1959, Ser. No. 863,312
10 Claims. (Cl. 179—18)

Figures 1, 2:
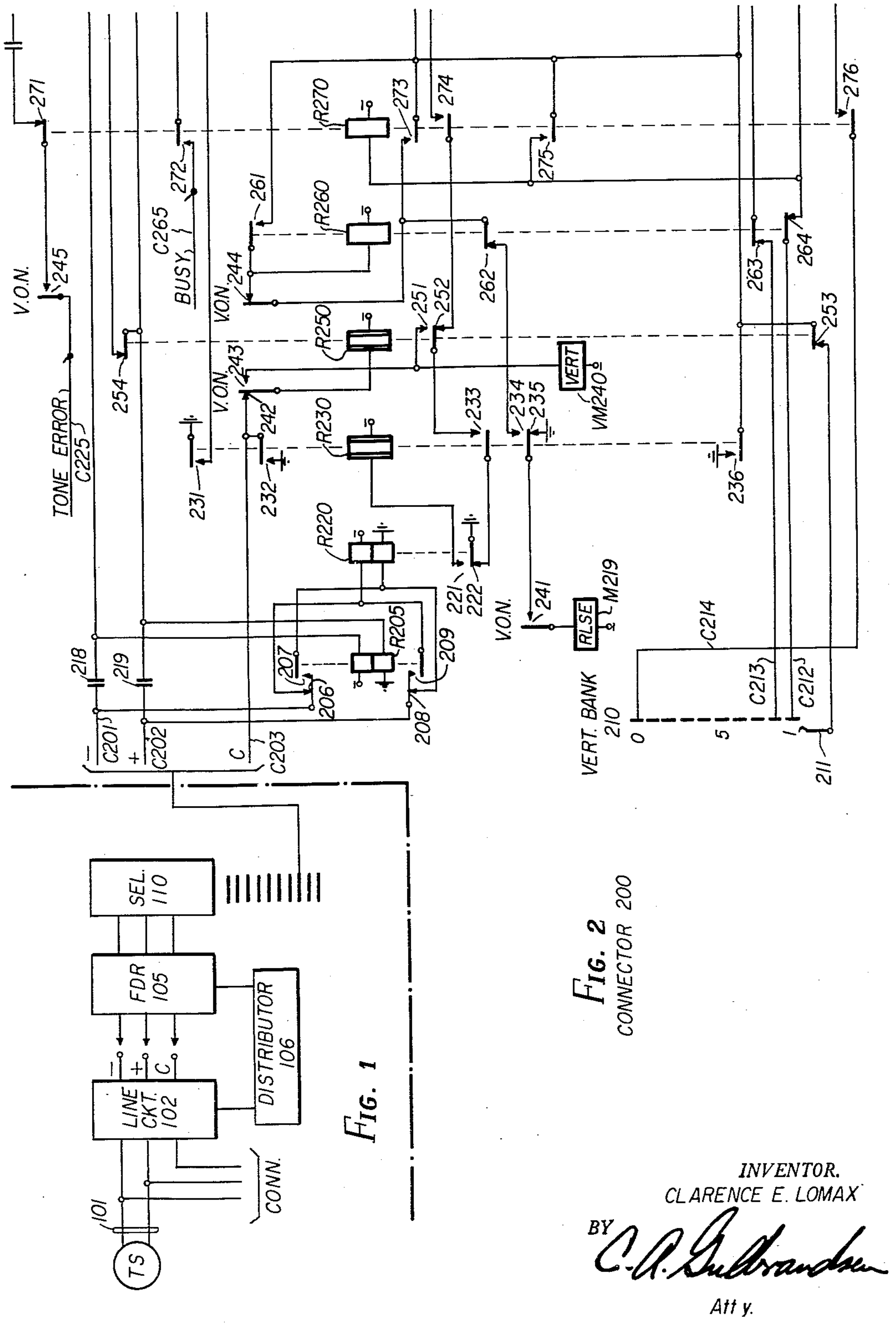
Figure 3:
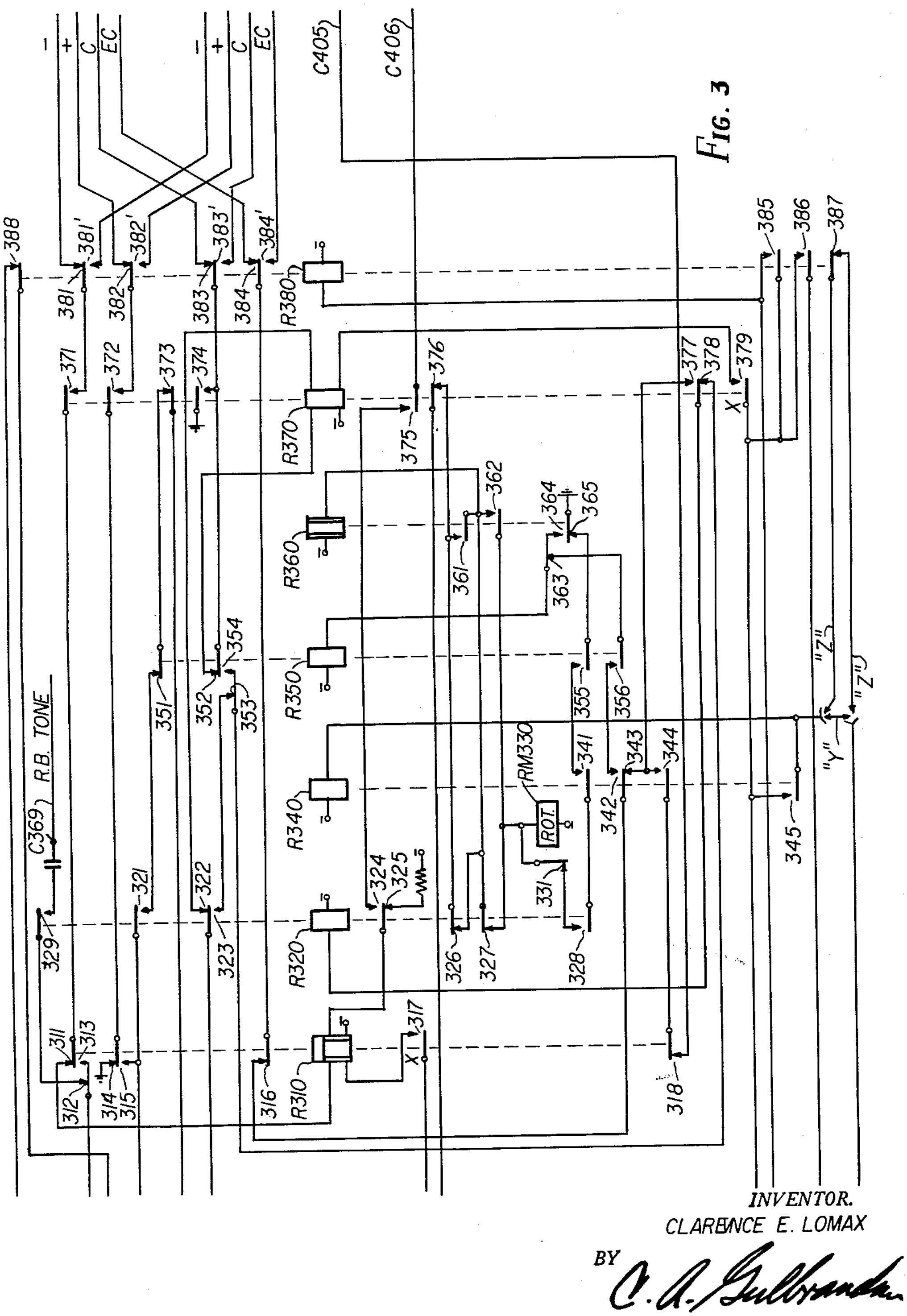

The present invention relates to automatic telephone systems and particularly to such systems including party lines and trunk lines served by a common connector.

As pointed out in my previous application, Patent No. 2,773,126, issued December 4, 1956, the need for having a single connector to provide for both party line service and P.B.X service is advantageous, inasmuch as these business lines have their heaviest incoming load during the work day, the condition is found that at the time the business subscriber class is exceedingly busy while the party line class is idle. Thus, when one class of connectors is used periodically for the sole purpose of one class while another class of connectors is used solely for the other class, each class of connectors are inactive at different times of the day and require duplication of similar equipment. Further, the monetary return per unit of equipment is low due to the long periods of non-use and the cost of maintaining the substantial duplication of equipment.

The preceding explains why the present connector application was made for expanding the above two digit 100 line connector, to a three digit connector of 200-terminal capacity in order to avoid the need of second or third selectors. In other words, this connector is intended for use in a 1600-terminal office, or thereabout.

It is a general object of the invention to provide an improved telephone system wherein party and trunk lines are served by a common connector.

A further object is to provide a three-digit connector having two wiper sets and separate bank levels, wherein the first digit dialed selects the wiper set to be utilized while thereafter absorbing this digit.

A still further object in combination with the above object is to provide party lines and P.B.X trunks intermixed but individual to the separate bank levels and accessible by either wiper set.

Another object is to provide a predetermined first digit wiper set selecting connector, wherein if the first digit is an incorrect first digit, the connector stops further digits from being effective and gives the caller an error indication.

Another object of the invention is to provide a ringing control arrangement of the harmonic type wherein frequency selection is based upon a test made through the connector employing a plurality of ringing signals matched with respect to corresponding marking potentials.

It is still another object of this invention to provide a modifiable connector of the type described whereby P.B.X stations can be accessed by only one wiper set on different levels; can be accessed by either wiper set on the same corresponding levels; or can be accessed by either wiper set on different corresponding levels.

Another object of this invention is to provide a vertical bank and auxiliary wiper for controlling the wiper set selection and automatic rotary for P.B.X levels.

Further features of the invention pertain to the particular arrangement of the circuit elements of the telephone system, whereby the above outlined and additional operating features thereof are attained.

The invention, both as to its organization and method of operation, together with further objects and advantages thereof, will best be understood by reference to the following specification and the drawings, forming a part thereof, wherein FIGS. 1 to 4, taken together, illustrate the details of an automatic telephone system provided with party lines and P.B.X stations and incorporating therein the features of the present invention. In the drawings, FIGS. 1 to 4, inclusive, should be arranged as shown in FIG. 5.

Referring more particularly to the drawings, there is illustrated therein an automatic telephone system comprising an exchange serving a number of subscriber lines including private subscriber line 101 extending to the private subscriber station TS, P.B.X lines 421 through 424 (422 and 423 not shown) and 431 through 440 (432 to 440 not shown) extending to P.B.X board 430, a group of party subscriber lines including the two-party subscriber line 410 extending to stations T257 and T100, and the four party subscriber line 415 extending to stations T156, T157, T258 and T259. The P.B.X board 430 and the party line stations, by way of illustration, are chosen to be of the terminal per station harmonic ringing type though code ringing might also be employed. The station TS might be on an individual or party line and rung by harmonic or code means, and all of the stations are comprised of conventional station apparatus. By way of illustration, the equipped first station T156 on line 415 is shown in schematic form and as shown includes apparatus 417 representing the transmitter, the receiver and dial equipment, a ringer 418 operatively connected across the line 415 via the associated capacitor 419 and hook switch circuit (not shown).

The apparatus provided at the other equipped stations, in both the two-party and four-party lines, include the same elements as in stations T156. In the telephone system, four ringing frequencies and a bridged ringing arrangement is provided whereby each equipped station on any party line is rung in each ringing cycle with a different ringing frequency, which may be 66 cycles, 54 cycles, 33 cycles and 25 cycles. For effective operation, no two stations on a party line should be rung at the same frequency. The system as will become apparent, could use up to a maximum of ten different ringing frequencies and the four shown are merely for exemplary purposes.

Also, each private and party subscriber lines and the P.B.X board is provided with a line or trunk circuit individual thereto, the private line 101 having the associated line circuit 102, the trunk line 421 having associated the trunk circuit 422, the trunk line 424 having associated the trunk circuit 425, the trunk line 431 having associated the trunk circuit 429, and the party lines 410 and 415 having associated the line circuits 411 and 416, respectively. The line circuits 102, 411 and 416 may be identical and of a conventional design. Similarly, the trunk circuits 422, 425 and 429 are conventional and identical.

Also, the system comprises a distributor 106 of any conventional design operatively associaed with the line and trunk circuits 102, 411, 416, 422, 425 and 429 as well as a plurality of finder-selector links. One of the links is illustrated and comprises a finder 105 shown in box form of any suitable type, although preferably Strowger type, and a selector 110 shown in box form, also of the Strowger type.

Figures 4, 5:
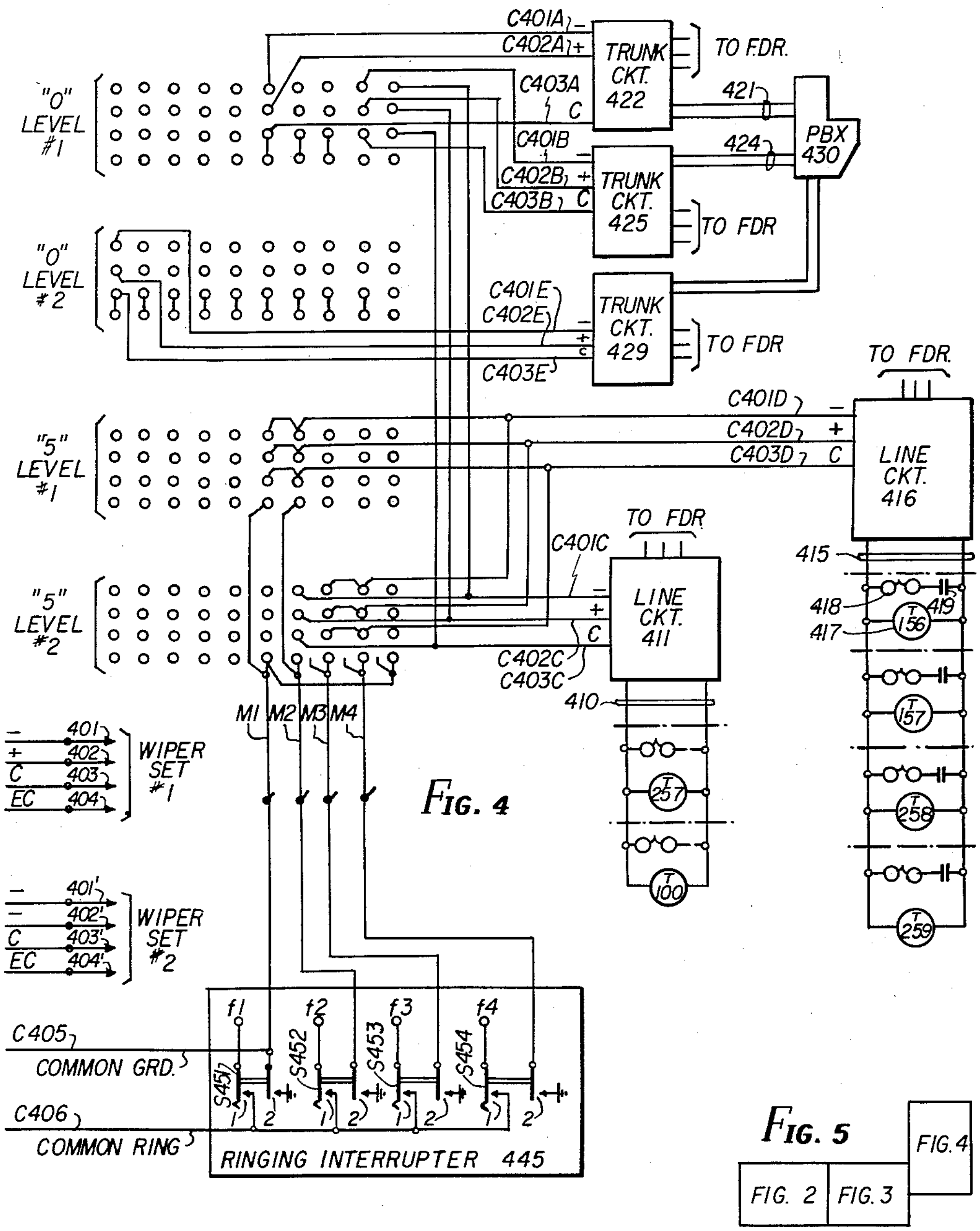

As illustrated, the connector 200 comprises a Strowger mechanism 400 including a pair of wiper sets, wiper set #1 and wiper set #2, a vertical magnet VM240 for driving the wiper carriage step by step in the vertical direction away from its normal vertical position, a rotary magnet RM330 for driving the wiper carriage step by step in the rotary direction away from its normal rotary position, and a release magnet M219 for releasing the wiper carriage and for causing it to be returned into its normal rotary and vertical positions. Also associated with the wiper carriage are vertical off normal post springs for controlling the VON contacts 241 to 245 that operate when the wiper carriage is driven in a vertical direction away from its normal vertical position. Additionally, the wiper carriage has associated with it an auxiliary wiper 211 that is stepped only in a vertical direction step by step onto a vertical bank 210 by the vertical magnet VM240, that is separate from the other levels and banks. The two wiper sets #1 and #2 each include a pair of line wipers 401, 402 and 401′, 402′ respectively, a control or C wiper 403 and 403′ respectively, and an extra control wiper or EC wiper 404 and 404′ respectively. In addition, the Strowger mechanism 400 includes a pair of contact banks on a plurality of levels, with each level including a plurality of contact sets for each set of wipers, and each contact set including contacts for engaging respectively the individual wipers of the wiper sets. In FIG. 4, only two bank contact levels for each wiper set are illustrated, respectively the "0" levels and "5" levels, although there are ten levels for each wiper set, and there are ten contact sets per level.

The "0" levels have been designated, arbitrarily, for purposes of illustration, the P.B.X trunk hunting levels although the plurality of contact sets therein are not necessarily limited to automatic trunk hunting or even trunk use and may, in accordance with the invention, serve individual and/or party subscriber lines, the latter of which is shown. In the "0" levels, the contact sets reserved for P.B.X trunk use are each connected to an individual trunk circuit. However, for simplicity, only three trunk circuits, 422 and 425 on "0" level #1, and 429 on "0" level # 2, are shown connected to the contact sets by conductors C401A, C402A, and C403A, and C401B, C402B and C403B, and C401E, C402E and C403E respectively, it being realized that additional trunk circuits are required for the other contact sets reserved for P.B.X trunk use. In the first three contacts sets reserved for trunk use on "0" level #1, the C and EC contacts are shown strapped together, while the first nine contacts on "0" level #2 have their C and EC contacts strapped together, to provide for P.B.X trunk hunting service which is described in detail hereinafter.

Further, the connector 200 comprises a relay group including a reversed battery relay R205, a line relay R220, a hold relay R230, a transfer relay R250, control relays R260 and R270, a ring cut-off relay R310, a test relay R320, a level relay R340, rotary control relays R350 and R360, a switch-through relay R370, and a wiper switch relay R380.

Also, the exchange comprises common equipment including a ringing interrupter 445 of a conventional design adapted to provide cyclically and sequentially frequencies *f1, f2, f3* and *f4* which may be, for example, 66 cycles, 54 cycles, 33 cycles and 25 cycles, respectively. In addition, the ring interrupter also provides a plurality of ground pulses which are individually contemporaneous with and matched to each ringing frequency and are individually applied to the EC terminals of bank contacts and to the connector 200.

Specifically, the ringing interrupter 445 includes the switch springs S451 through S454. Each switch includes two springs and contact points 1 and 2 individual to each of the switch springs which are made to move in unison by an insulator bar connected therebetween. Contact 1 of each switch connects a ringing frequency to a common ringing conductor C406 and contact 2 extends ground potential to a marking conductor. Thus, when the contacts of switch spring S451 are closed, a ringing signal of a frequency *f1* is extended to conductor C406 and ground potential is extended to conductor M1. A short time later, the contacts of switch spring S452 are closed and the ringing signal *f2* and ground potential are extended respectively over C406 and M2. Still later, spring S453 is operated extending *f3* to C406 and ground to M3, and S454 is operated extending *f4* to C406 and ground to M4. Other frequencies and marking leads could be added as desired, for instances an *f5, f6* etc., in conformity with an M5, M6 etc. As these switches are operated cyclically and sequentially in the manner described a continuous chain of signal frequencies appear on the conductor C405 and ground pulses appear intermittently and regularly on conductors M1, M2, M3 and M4. The effect of the operation of the ringing interrupter in a telephone system in accordance with the invention will be understood from a detailed description given hereinafter.

In the telephone system, each private subscriber station, each P.B.X station and each party subscriber substation is designated by a four digit directory number individual thereto. The first digit is responded to by the selector 110 to seize the connector such as 200, the second digit indicates which wiper set is to be utilized and is absorbed, the third digit indicates the vertical bank level, and the last digit indicates the contact set in the bank level of the connector terminating the associated subscriber line.

The mode of operation of the apparatus incorporated in the telephone system will be better understood from the following description of calls involving the various subscriber stations and PBX trunks.

*Seizure of connector 200*

Assuming that a call is initiated at the private subscriber station TS, the associated line circuit 102 is controlled in order to start the distributor 106 to assign an idle link such, for example, as that illustrated and to control operation of the line finder 105 thereof to find the subscriber line 101 extending to the calling private subscriber station TS. When the line finder finds the subscriber line 101, the line circuit 102 is controlled in order to mark the subscriber line 101 as busy to the selectors 110, etc. having access thereto and to dismiss the distributor 106. At this time, a loop circuit is completed for energizing in series the line relay windings (not shown) in selector 110, which includes the finder 105 and the subscriber line 101 extending to the calling station TS. Other relays in selector 110 will respond in a manner well-known in the art relative to Strowger operations.

Assuming that this call is to be extended via a connector having a plurality of party lines, such as 410 and 415, and P.B.X station, such as 430, upon receipt of a dialed digit or digits the call will be extended to a connector, such as 200, in a well-known Strowger manner. It being understood that second and third selectors could be utilized in this system corresponding to the number of directory digits as required. However, for exemplary purposes it will be assumed that a first digit "3" will be sufficient to step the wipers of selector 110 both in a primary and secondary direction to seize the idle connector 200.

At this time, a loop circuit is completed for energizing in series the upper and lower windings of the line relay R220, which includes the selector 110, the finder 105 and the subscriber line 101 extending to the calling station TS; whereby the line relay R220 operates to complete at its contacts 221 a circuit for operating the hold relay R230. Upon operating, the hold relay R230 closes the contacts 232, applying ground to the C conductor C203 to retain the selector 110, finder 105 and line circuit 102 in their operated positions. The operation of the hold relay R230 causes ground to be applied through contacts 232, VON contacts 242, and the winding of transfer relay R250 to battery to operate the last named relay. Upon operating, the transfer relay R250 prepares at contacts 251 a point in a circuit for operating a vertical magnet VM240 of the Strowger mechanism 400. Thus at this time, the call initiated at the calling private subscriber station TS has been extended via the subscriber line 101, the finder 105, and the selector 110 to the connector 200, and the connector 200 is conditioned to respond to digits comprising the directory number of the called station.

*Calls to subscriber lines*

Assuming that this call is to be extended to the first party station T156 on the party subscriber line 415, the call must be extended over the #1 wiper set of the Strowger mechanism 400. Thus the subscriber at the calling subscriber station TS dials the three succeeding digit directory number of the called first party station T156 which may be "156." The line relay R220 follows the pulses of the first digit "1" whereby the line relay restores and reoperates one time, it interrupts and then recompletes at contacts 221 the circuit for energizing the winding of the hold relay R230 whereby the latter relay is retained in its operated position during the dialing as it is of the slow-to-release type. Also, each time the line relay R220 restores and then reoperates, it completes and then interrupts at the contacts 222 a circuit including contacts 233 and 251 for energizing vertical magnet VM240. Accordingly, the vertical magnet VM240 is operated and restored one time driving the wiper carriage of the Strowger mechanism 400 one step in the vertical direction away from its normal position. When the wiper carriage of the Strowger mechanism is moved this first step in the vertical direction away from its normal position, the sets of vertical off normal springs are operated. Also, the auxiliary wiper 211 takes one step in response to the pulse received by the vertical magnet VM240. Ordinarily on a dialed digit greater than "1", the closure of VON contacts 243 would close a circuit to the transfer relay R230 in multiple with the vertical magnet VM240 to maintain this relay operated, since on the first vertical step of the wipers VON contacts 242 would open the original operating circuit to the transfer relay R230. The VON contacts 241 close to prepare a circuit to the release magnet M219; the VON contacts 244 opens a prepared circuit to the relay R260; and the VON contacts 245 close to prepare an error tone to the calling subscriber.

At the conclusion of the second digit "1," the line relay R220 is retained in its operating position, retaining operated the hold relay R230 and causing transfer relay R250 to restore shortly thereafter. Upon restoring, the transfer relay R250 closes at contacts 253 a circuit traced hereinafter for operating the relay R270; interrupts the above traced circuit for energizing the vertical magnet VM240 at contacts 251; and then prepares at the contacts 252 a circuit to be traced hereinafter for the rotary magnet RM330. Also contacts 254 close, but has no effect at this time. The circuit to the relay R270 extending from battery, winding of the relay R270, contacts 264, conductor C212, first bank contact on the vertical bank 210, auxiliary wiper 211, contacts 253 and 236 to ground. The relay R270 upon operating closes contacts 272 to prepare busy tone to the calling subscriber, and contacts 271 further opens the prepared error tone circuit. Also, contacts 273 closes a circuit to the release magnet M219 to be hereinafter traced. The contacts 274 close to prepare a circuit to the rotary magnet RM330 for later rotary pulses. Further, contacts 275 closes an obvious holding circuit for maintaining the relay R270 operated. The circuit to the release magnet M219 extending from battery, winding of the release magnet M219, VON contacts 241, contacts 234, 262, 273 and 236 to ground. The release magnet M219 upon energizing returns the wiper carriage of the Strowger mechanism 400 including the auxiliary wiper 211 to normal, thus restoring the VON springs to normal. The reopening of VON contacts 241 will thus deenergize the release magnet M219, and the reclosure of VON contacts 242 will reoperate the transfer relay R250. Further, the reclosure of VON contacts 244 closes a circuit to relay R260 via contacts 273 and 236 to ground. Upon operating, at contacts 261 relay R260 closes a locking circuit for itself via ground at contacts 236. Also, contacts 262 opens a prepared circuit to the release magnet M219. With relay R250 reoperated, connector 200 is ready to receive the next dialed digit with the addition of relays R260 and R270 operated which determines that the #1 wiper set of Strowger mechanism 400 is to be utilized on this call. Thus, the first digit "1" dialed into connector 200 is absorbed.

The subscriber at the calling station TS then proceeds to dial the third digit "5" which dialing is again followed by the line relay R220. Each time the line relay R220 restores and then reoperates, it completes and then interrupts at the contacts 222 the previously traced circuits to the transfer relay R250 and the vertical magnet VM240, and at contacts 221 the circuit to relay R230 is interrupted and recompleted maintaining this slow-to-release relay operated. Accordingly, the vertical magnet VM240 is operated and restored five times in succession driving the wiper carriage of the Strowger mechanism 400, including the auxiliary wiper 211, five steps in the vertical direction away from its normal position and the transfer relay R250 is energized by the dialing pulses. Upon the wiper mechanism taking the first step the vertical-off-normal springs again operate as previously described.

At the conclusion of the third digit "5," the line relay R220 is retained in its operating position, retaining operated the hold relay R230 and causing transfer relay R250 to restore shortly thereafter. Upon restoring, the transfer relay R250 prepares at contacts 252 a circuit to be traced hereinafter to the control relay R360 and the rotary magnet RM330. Contacts 253 close, however the auxiliary wiper 211 is engaging the open fifth bank contact of the vertical bank 210 and is therefore ineffective. At this time, the relays R220, R230, R260, R270 and the VON springs are all operated; the vertical magnet VM240 has deenergized; the wipers 401, 402, 403, 404, 401', 402', 403', and 404' of Strowger mechanism 400 are adjacent their respective fifth levels of bank contacts; and the auxiliary wiper 211 is engaging the fifth bank contact of the vertical bank 210.

The subscriber at the calling station TS then proceeds to dial the fourth digit "6" which dialing is again followed by the line relay R220. Each time the line relay R220 restores and then reoperates, it completes and then interrupts at the contacts 222 the previously prepared circuits for operating the control relay R360 and the rotary magnet RM330 which circuits include, respectively, contacts 233, 252, 274, 377, 326 winding of the control relay R360 to battery, and contacts 327, winding of the rotary magnet RM330 to battery. Accordingly, the control relay R360 operates and because it is of the slow-to-release type remains operated during the dialing, and the rotary magnet RM330 is operated and restored six times driving the wiper carriage of the Strowger mechanism 400 six steps in the rotary direction away from its normal rotary position. Upon operating, the control relay R360 closes and completes at contacts 361 and 362 alternate paths of operation for itself and the rotary magnet RM330 independent of the contacts of the relay R320. Also, contacts 364 close an obvious operating circuit to the relay R350. Upon operating the relay R350 opens at contacts 351 the prepared busy tone to the calling line. Also, contacts 354 close to prepare a circuit to be hereinafter traced for testing the busy or idle condition of the called line. Contacts 355 and 356 close, however they are insignificant on this type of call.

At the conclusion of the fourth "6," the line relay R220 is retained in the operated position, retaining operated the hold relay R230 and causing the operating circuits to the control relay R360 and the rotary magnet RM330 to be interrupted at contacts 222. Thus, at the end of the dialing of the fourth digit, the Strowger mechanism 400 has been stepped to the sixth contact sets on the fifth contact bank levels and control relays R350 and R360 are operated due to relay R360 being slow-to-release and maintaining the relay R350 operated. A moment thereafter, control relay R360 restores to in turn restore relay R350. It should be pointed out that the contacts 361 and 362 which make an alternate operating path for the relay R360 and the rotary magnet RM330, are necessary in the event the wipers while rotating may momentarily engage busy or grounded bank contacts which would operate the relay R320 to open the original operating circuit to the rotary magnet. This last circuit may be traced from ground momentarily encountered by the control wiper C403, contacts 383, 354, 378, and the winding of relay R320 to battery. This would ordinarily interfere with rotary pulsing by momentarily opening contacts 326 and 327. However, with the alternate path provided by the relay R360 the rotary pulses are not interfered with.

First assuming that the called party line 415 is busy at this time, ground potential is on the C conductor C403D thereby completing a circuit through wiper 403, contacts 383, 354 (relay R350 has not as yet restored), 378, winding of the testing relay R320 to battery. Upon operating, testing relay R320 at contacts 321 close to prepare a busy tone to the calling subscriber. Contacts 322 opens the prepared circuit to the switch-through relay R370; contacts 323 close to prepare a locking circuit for testing relay R320; contacts 324 opens a prepared ringing circuit to the called subscriber; and contacts 326 and 327 further open the rotary pulsing circuit. Relays R360 and R350 restore as previously described, and at contacts 351 the previously prepared busy tone circuit is closed to be hereinafter traced. The contacts 352, 353 and 354 are make-break-before make contacts on restoration of the relay R350 whereby, contacts 353 closes first to complete a locking circuit for testing relay R320 before contacts 354 opens the original operating circuit for this relay. This last mentioned locking circuit extending from battery, winding of the testing relay R320, contacts 378, 353, 323, and 231 to ground. At this time, busy tone is returned to the calling subscriber station TS over a circuit including conductor C265, contacts 272, 374, 351, 321 and back over the positive side of the line C202 indicating to the subscriber that the desired connection may not be had at this time due to the busy condition of the called party line 415. The subscriber at the calling subscriber station TS then disconnects to release the equipment in a manner to be described under the heading "Release" to follow.

Now assume that the connector 200 has been operated in response to the fourth digit "6" dialed at the subscriber station TS, and at the conclusion of the dialing of the directory number "3156" of the called first party station T156 on the called party line 415, the called party line 415 is idle. At this time, battery potential from the cut-off relay (not shown) in the line circuit 416 is applied to the control wiper 403 via the control conductor C403C, and thus the testing relay R320 will not operate on this potential. At this time, when relay R350 restores as described, this battery is extended via contacts 383, 352, upper winding of the switch-through relay R370, contacts 322 and 231 to ground. Switch-through relay R370 thus operates closing its preliminary make "X" contacts 379 first to close a locking circuit for its maintained operation through its lower winding via ground at contacts 236. Thereafter, the remaining contacts of the switch-through relay R370 operate whereby, contacts 371, 372 and 375 close to prepare a ringing frequency to the called line to be hereinafter traced. Contacts 374 close ground to the control wiper 403 to hold the succeeding line circuit 416 and busy the line 415 to other connectors. Contacts 377 close to connect the testing relay R320 to the EC wiper 404 via contacts 343, 316 and 384; and contacts 376 further opens the prepared circuits to relay R360 and the rotary magnet RM330.

Thereafter, the interrupted ground applied by marking conductor M1 to the EC bank contact and wiper 404 associated with the called party station T156 is extended to the testing relay R320 via the previously traced prepared circuit. In response to the interrupted ground potential on EC wiper 404, relay R320 operates and restores and during the operation periods completes at contacts 324 including the upper winding of the ringing relay R310 for applying a ringing potential from conductor C406 to negative conductor C401D via EC wiper 404, contacts 381, 372, and 311. Also, at contacts 329 ring-back tone is intermittently extended to negative conductor C201 and thence to the calling line 101 via conductor C369. As this circuit is completed only during the intervals of interrupted ground from M1, only the ringing signal matched to the ground pulse, that is, $f1$, is transmitted to conductor C401D and thence to line 415, and because the ringer at station T156 is the only one on the line tuned to this frequency, only T156 is rung.

Thus, if the called party is idle, switch-through relay R370 is operated and locked by its holding circuit, ground potential is applied to the C conductor C403D, relay R320 is intermittently operated in response to the interrupted ground pulse applied to the EC wiper 404 whereby ring-back tone is applied to the calling line 101 intermittently, and a frequency ringing signal is applied to the called line 415.

In response to the ringing signal, the called subscriber at subscriber station T156 answers thereby interrupting the ringer circuit for 418 and completing the circuit across party line 415 for energizing the ring cut-off relay R310, the circuit including ground at contacts 314, 372, 382, wiper 402, conductor C402D, party line 415, receiver-transmitter 417, conductor C401D, wiper 401, contacts 381, 371, 311, upper winding of relay R310, contacts 325 to resistance battery. Ring cut-off relay R310 now operates closing its preliminary make "X" contacts 317 first for completing a holding circuit for the lower winding thereof via ground at contacts 236. Thereafter, contacts 311, 312 and 314 are interrupted and contacts 313 and 315 are closed, thereby causing the connector to switch through and to connect the negative line conductor C401D and positive line conductor C402D to conductor C201 and C202, respectively. At the same time, contacts 316 are interrupted thereby preventing further operation of relay R320. The ring-back tone circuit to conductor C201 is interrupted at contacts 312 as well as at contacts 329 with the complete release of relay R320. Finally, the ring cut-off relay R310 completes at contacts 313 and 315 a loop circuit for energizing in series the upper and lower windings of the reverse battery relay R205. This circuit extends from ground potential at the lower winding of relay R205 to battery potential at the upper winding of the relay and includes conductors C201 and C202 as switched through to the called party loop at contacts 313 and 315. When this circuit is completed, the reverse battery relay R205 operates to reverse at contacts 206, 207, 208 and 209 the polarity of the connection between the upper and lower windings of the line relay R220 and the line conductors of the subscriber line 101 extending to the calling subscriber station TS. The reversal of polarity over the line conductors of the subscriber line 101 may be employed in the line circuit 102 for metering or for other uses in a conventional mode, not illustrated. Finally, the loop circuit extending from the calling subscriber station TS to the line relay R220 is operatively connected by capacitors 218 and 219 to the loop circuit extending between the called first party station T156 and the windings of the reverse battery relay R205 whereby the subscriber at the calling subscriber station TS and the subscriber at the called first party station T156 may converse with each other.

At the conclusion of the established connection the subscribers will hang up and release the equipment in a manner to be described under the heading "Release" to follow hereinafter.

Should the subscriber at the calling subscriber station TS initiate a call to subscriber station T157, on party line 415, the operation of the telephone system will be substantially the same as described above. If, for example, the calling subscriber should dial the directory numbers "3157," the wiper sets of the Strowger mechanism 400 will connect to the fifth levels and the seventh sets of contacts in the two contact banks, with only wiper set #1 being effective, as described above, for extending the connection. It being understood that the dialing of the first digit "1" into connector 200 determines that the #1 wiper set is to be utilized. The ringer at the called party line station T157, being of the harmonic type, will respond to the ringing frequency *f*2, which may be, for example, 54 cycles, applied to the party line 415 through the connector 200 in cooperation with the interrupted ground pulse applied by marking conductor M2 to the EC contact in the seventh set of contacts on the fifth levels of the contact banks. As pointed out above, the joint application of this interrupted ground pulse and the ringing frequency to the connector 200 will permit transmission of the ringing frequency *f*2 to the called party line 415 and the consequential ringing at the party station T157.

Should however, the calling subscriber at the subscriber station TS call the subscriber stations T258 or T259 on the party line 415, the connector 200 will respond in a manner different than that described above, since they can only be rung over the #2 wiper set of the Strowger mechanism 400. Thus, the directory number for the subscriber stations T258 and T259 would be 3258 and 3259 respectively.

Assuming that the subscriber at the calling subscriber station TS initiates a call to the subscriber station T258, the dialing of the first digit "3" will cause seizure of connector 200 as previously described. The calling subscriber will thus dial into connector 200 the three succeeding digit directory number of the called party station T258, which may be "258." The line relay R220 follows the pulses o fthe second digit "2," to complete and interrupt at contacts 222 the previously traced circuits to the transfer relay R250 and the vertical magnet VM240. Accordingly, the vertical magnet VM240 is operated and restored two times in succession driving the wiper carriage of the Strowger mechanism 400 including the auxiliary wiper 211, two steps in the vertical direction. The VON springs will also operate on the first vertical step as previously described.

At the conclusion of the second digit "2," the line relay R220 and hold relay R230 are retained operated and the hold relay R250 restores as previously described. Upon relay R250 restoring, the wiper switch relay R380 operates instead of the relay R270 as had been the case on dialing "1." This circuit extending from battery, winding of relay R380, contacts 263, conductor C213, second bank contact and wiper 211 of the vertical bank 210, contacts 253 and 236 to ground. Upon operating, the wiper switch relay R380 closes at contacts 385 a locking circuit for itself to ground at contacts 236. Also, contacts 386 close an obvious circuit to the relay R270 via ground at contacts 236; contacts 387 (if the "Z" strap is used) opens a prepared circuit to the relay R340; and contacts 388 further opens the prepared tone error circuit. Lastly, contacts 381, 382, 383 and 384 open while contacts 381', 382', 383', and 384' close to switch the preparation for extending the connection from wiper set #1 to wiper set # 2 of the Strowger mechanism 400. Upon operating, the relay R270 at contacts 273 closes the previously traced circuit to the release magnet M219; at contacts 275 relay R270 locks itself operated; and as previously described prepares a circuit to the relay R260 at contacts 273. The release magnet M219 energizes to thus return the wipers to normal, restoring the VON springs to normal in the process. Thus, VON contacts 242 reclose to reoperate the transfer relay R250; VON contacts 244 close to operate the relay R260 over a path previously described; and VON contacts 241 opens to deenergize the release magnet M219. The only difference over the previous description is that the wiper switch relay R380 is operated at this time along with the relays R220, R230, R250, R260 and R270.

Since the same operations would occur upon receipt of the third and fourth digits "58" respectively as previously described, with the exception of the wiper set and contact bank set utilized, only the latter will be further elucidated upon. The dialing of the last two digits "58" will still step both the #1 wiper set and the #2 wiper set to their respective fifth levels of bank contacts and eighth rotary bank contact, but only the #2 wiper set will be effective to complete the connection since the wiper switch relay R380 is operated. Thus omitting the possibility of a busy condition since operations would be the same as previously described, attention will only be made to an idle condition.

At the conclusion of the last digit "8" being dialed and the existence of an idle condition on party line 415, relays R220, R230, R260, R270, R370 and R380 are operated as previously described. Thus, the interrupter ground applied by marking conductor M3 to the EC bank contact and wiper 404' associated with the called party station T258 is extended to the testing relay R320 via the previously traced prepared circuit. In response to the interrupted ground potential on EC wiper 404', relay R320 operates and restores as previously described to intermittently close contacts 324 to apply a ringing potential from conductor C406 to negative conductor C401D via EC wiper 404'. As this circuit is completed only during the intervals of interrupted ground from M3, only the ringing signal matched to the ground pulse, that is, *f*3, is transmitted to conductor C401D and thence to line 415, and as previously mentioned only the ringer of subscriber station T258 is tuned to this frequency, so only this ringer on party line 415, will be rung. The called party answering will cause the connector to extend the connection in a manner previously described.

A call to subscriber station T259 will obviously be consummated in a manner described above.

In a call from the subscriber station TS to the party line station T257, the directory number "3257" is dialed so that the wiper sets of the connector select their respective seventh contact sets in the fifth level of the contact banks, and only wiper set #2 being effective to extend the connection due to the second digit "2" as described. Upon making contact with this set, the idle or busy test is completed by connector 200 in a manner previously explained. Assuming that the subscriber line 415 is idle, the switches in connector 200 are operated to complete a ringing circuit and the ringer at station T257 is operated at the frequency *f*2. Ringing takes place at the frequency *f*2 due to the harmonic tuning of the ringer therein and the fact that the EC contact in the seventh contact set of the fifth level is strapped to the marked conductor M2 associated with the frequency *f*2 in the ringing interrupter 445. Obviously, the EC contact in the seventh contact set of "5" level corresponding to #2 wiper set would not necessarily have to conform to the same marking lead M2 as the seventh contact set of "5" level corresponding to #1 wiper set as shown, since the strappings could be altered as desired except the ringers must be adapted to the frequency. Upon answering at the party line station T257, the connector switches through as described previously.

In initiating a call from station TS to party line station T100, the directory number "3100" is dialed whereupon after the conclusion of the second digit "1" relays R220, R230, R250, R260 and R270 are operated and the #1 wiper set is to be utilized for extending the connection all as previously described. However, the next digit "0" will bring in a different operation since the "0" level on the connector bank is mainly for P.B.X calls, but the following description is to show how even a P.B.X level can be used for party line calls while avoiding the description of P.B.X calls for the time being.

Upon receipt of the third digit "0," the wiper sets of the Strowger mechanism 400 are stepped to their tenth level of bank contacts respectively in a manner previously described. The auxiliary wiper 211 will thus engage the tenth bank contact on the vertical bank 210, and when the slow-to-release transfer relay R250 restores a circuit is closed to the level relay R340. This last circuit extending from ground, contacts 236, 253, wiper 211 and tenth contact of vertical bank 210, conductor C214, contacts 276, 387 and the winding of relay R340 to battery. Upon operating, relay R340 closes at contacts 345 a direct locking circuit for itself via ground at contacts 236. Also, contacts 341 close to prepare a self-interrupter circuit to the rotary magnet RM330; contacts 342 close to prepare a circuit from the relay R350 to the EC wiper 404. Furthermore, contacts 344 close to prepare a circuit from the testing relay R320 to the common ground conductor C405. Thus, at the conclusion of the third digit "0," relays R220, R230, R260, R270 and R340 are operated.

Upon receipt of the last digit "0," the line relay R220 will respond to pulse the rotary magnet RM330 in a manner previously described to step the wiper sets to their respective tenth bank contacts on the tenth level, wherein the "0" level #1 terminates in the subscriber party line 410. Thereupon, the connector makes a test of the idle or busy condition of party line 410 in the manner as previously explained. Assuming that the called party line 410 is idle, ringing is controlled via the common ground conductor C405 due to the operated position of the level relay R340 causing the ringing frequency applied to the line 410 to be at the frequency $f1$. Ringing takes place with the frequency $f1$, for example 66 cycles, due to common ground conductor C405 being arbitrarily strapped to marking conductor M1 in the ringing interrupter 445 and thence transmitted over contacts 318, 344, 377 to the winding of testing relay R320. Relay R320 thus intermittently operates and releases, thus intermittently closing at contacts 324, the ringing frequency $f1$ to the called party line 410, and to thus ring the ringer of the subscriber station T100 tuned to this frequency. It is obvious of course, that no more than one bank contact set on the tenth level could be used for the same party line, because this level is limited to the one ringing frequency $f1$. However, it should be understood that this level may be adapted to ring at any of the frequencies transmitted from the ringing interrupter 445 and the common ground conductor C405 may be strapped accordingly.

Although only two levels on the connector bank levels have been described, various types of line services could be utilized without omitting any particular level. For instance, although the dialing of a first digit "1" or "2" into connector 200 is absorbed and utilized for choosing the wiper set, the digits "1" or "2" can be used as second digits also into connector 200. In other words, the first and second level of bank contacts are available for extending a connection since after dialing the digits "1" or "2" the first time, the operation thereafter of relay R260 opens contacts 262 extending to the release magnet M219, to prevent restoring the wiper sets if either of these digits are dialed a second time. Thus, the wiper sets would vertically step to the first or second levels of bank contacts, and cut in on a succeeding digit.

*P.B.X calls*

Should the subscriber at station TS desire connection to the P.B.X board 430, which is served by a plurality of trunks on the tenth level of bank contacts, the third digit dialed would have to be the digit "0." Referring briefly to FIG. 4, only three trunks are shown having access to the P.B.X board namely trunks 422 and 425 on the "0" level #1, and the trunk 429 on "0" level #2. Actually however, trunk 422 is the first of four trunks on "0" level #1 as previously mentioned and trunk 425 is the last of these trunks on this level, while trunk 429 is the first of ten trunks on "0" level #2. In regards to P.B.X calls via "0" level #1, it will be immaterial whether the "Y" or "Z" strap is used since the same operations will occur as will become obvious from the succeeding description. Thus, a P.B.X call via "0" level #1 will be described first, and the "Y" or "Z" straps which are more concerned with "0" level #2 will be described as a modification means in the succeeding description.

Upon the call to the P.B.X board 430 via "0" level #1 from the subscriber station TS, the dialing of the first three digits "310," the connector of the Strowger mechanism 400 will be operated as described previously with reference to the dialing of the party line station T100 wherein the Strowger mechanism selects the "0" levels in the contact banks. At this level it will be recalled that the level relay R340 operates due to the auxiliary wiper 211 engaging the tenth bank contact on the vertical bank 210 as previously described either via the "Y" strap, or via the "Z" strap and closed contacts 387, whichever is utilized. Thus, at this time relays R220, R230, R260, R270 and R340 are operated.

The last digit dialed may be either the digits "6," "7," "8" or "9," and assuming or preferably the digit "6" as the last digit dialed, causes the wiper sets of the Strowger mechanism 400 to search out their respective sixth sets of contacts in the "0" levels of the contact banks, with only the #1 wiper set to be effective to extend this connection. At this sixth contact set, the wipers of wiper set #1 are connected to the first of the four trunks located consecutively on this level, namely trunk circuit 422. The operation of the level relay R340 closes contacts 341 to prepare the automatic rotary circuit in the event of a busy condition.

Now assuming that the first trunk 422 is busy, ground potential is returned from trunk 422 over the C conductor C403A to the C contact in the contact bank. In this sixth contact set, as in the two succeeding contact sets connected to the P.B.X trunks, the C and EC contacts are strapped together. Thus in this instance, ground potential is returned to the C and EC wipers 403 and 404 respectively. After this last digit has ben dialed and after the control relay R360 has restored but before control relay R350 has completely restored, ground potential from the EC wiper 404 is applied from C conductor C403A through a circuit including contacts 384, 316, 342, 356, 364 and the winding of control relay R350 to maintain this last relay operated. In other words, when control relay R360 restored at the end of dialing it closed its contacts 363 before opening at contacts 364 the operating circuit to control relay R350. Also, this same busy ground potential on the C wiper 403 was also extended via contacts 383, 354, and 378 to operate the testing relay R320. Thus, the combined operations of relays R320, R340 and R350 completes a self-interrupter circuit to the rotary magnet RM330 via ground, contacts 365, 355, 341, 328 and 331 to battery through the winding of rotary magnet RM330. The rotary magnet RM330 energizes causing the Strowger mechanism 400 to step to the next, or seventh, contact set and at the same time interrupts contacts 331 causing the rotary magnet to deenergize. In the event that the second trunk connected to the seventh contact set of banks is busy, the rotary magnet RM330 is operated in a manner as described above causing the wiper sets to make an additional step to the eighth contact set. A similar test is performed here and in the event that a third trunk associated with the eighth contact set is busy, rotary magnet RM330 is again operated causing the wiper sets to step to the ninth contact set associated with the fourth trunk 425. At the ninth contact set, the C and EC contacts are not strapped together and the trunk testing function is completed in a manner as described with reference to the testing of the party line 410. Assuming that the fourth trunk is also busy, ground potential returned to the C wiper 403 causes the test relay R320 to operate in a manner as described heretofore thereby returning at contacts 321 busy tone from conductor C265 to the calling station TS. Thereupon, the subscriber at station TS disconnects effecting release of the connector in a manner to be described hereinafter under the heading "Release."

In the event that the fourth trunk 425 associated with the ninth contact set is idle, the appropriate connector switches are operated as previously explained, for applying ring-back tone to the calling line 101 and transmitting a ringing frequency to the P.B.X board 430. Ringing takes place with the frequency *f*1, for example 66 cycles, due to the common ground conductor C405 being arbitrarily strapped to marking conductor M1 in the ringing interrupter 445 as previously explained.

Ringing takes place at the P.B.X station 430 and when the operator closes the cord circuit the connector switches through completing the conversation connection between the called P.B.X switchboard 430 and the calling station TS in a manner as previously explained with reference to the call to the station T100.

Before describing a P.B.X call via the "0" level #2, it is felt necessary to first discuss the "Y" and "Z" strapping since they represent different modifications which could be utilized as desired. In general, the "Y" strapping is utilized if it is desired to have P.B.X calls on both any specified #1 and #2 levels. The "Z" strapping is utilized if it is desired to have P.B.X calls limited to only specified #1 levels. For instance, if the "Z" strapping were used it would be impossible to operate the P.B.X level relay R340, since in choosing the #2 wiper set by operating the wiper switch relay R380 for entrance into the "0" level #2, contacts 387 would open the circuit to the relay R340 which controls the automatic rotary. Thus, with the "Z" strapping P.B.X calls would have to be limited to the #1 levels, providing of course, that conductor C214 were connected to the desired bank contacts on the vertical bank 210, and these desired levels would also have to disconnect any marking leads M1, M2 etc. from the EC contacts of these particular #1 levels. With this arrangement, the line circuits and P.B.X trunks shown on "0" level #2 and "5" level #1 could be reversed from that shown, so that P.B.X calls could be made on such levels as "5" level #1 and "0" level #1, while party line calls could be made on such levels as "0" level #2 and "5" level #2 in combination with all remaining #1 and #2 levels.

Since the "Z" strapping and contacts 387 would not be utilized for P.B.X calls on the #2 levels, the "Y" strapping will now be considered. Assuming then a call to the P.B.X board 430 via "0" level #2 from the subscriber station TS, the dialing of the second and third digits "20," the connector of the Strowger mechanism 400 will operate as previously described with reference to the dialing of the party line station T257 with the exception that relay R340 operates over a circuit including ground, contacts 236, 253, wiper 211 and tenth bank contact on the vertical bank 210, conductor C214, contacts 276, "Y" strapping, and winding of the level relay R340 to battery. Thus, the Strowger mechanism 400 selects the "0" levels in the contact banks, while the wiper switch relay R380 operates after the second digit "2," as previously described, to prepare the connection only over the #2 wiper set. Thereafter, the last digit "1" is dialed of the directory number, assuming "3201," causing the wiper sets to search out their respective first sets of contacts in the "0" levels of the contact banks. The remaining operations as above described on the "0" level #1, will take place. This level, as mentioned, comprises ten P.B.X trunks and a search will be automatically made until an idle trunk extending to the P.B.X board 430 is found. The call will cut-in in a manner previously explained.

It is to be understood, that the "0" level #1 and the "0" level #2 could comprise a separate P.B.X on each level or a plurality of P.B.X's and the system shown is merely for explanatory purposes. Furthermore, the conductor C214 designating a P.B.X call by controlling the operation of the P.B.X level relay R340, could be connected to any vertical bank contact corresponding to a desired P.B.X level. In fact, P.B.X's could be associated with any combination of #1 or #2 levels, as desired.

*Incorrect dialed digits*

Since the first digit dialed into the connector 200 is absorbed and determines whihc wiper set is to be chosen for extending the connection, these digits "1" or "2" cannot be bypassed or excluded from the directory number. Thus, the connector 200 is designed to transmit an error tone to the calling station in the event any first digit, other than "1" or "2," is dialed into connector 200. For instance, assuming that after seizure of connector 200, the calling subscriber TS inadvertently dials the first digit "0" into connector 200 in an attempt to make a P.B.X call. The line relay R220 will respond as previously described to interrupt the circuit to the vertical magnet VM240 and step the Strowger mechanism 400 and the vertical wiper 211 to their tenth vertical positions. Upon the first vertical step, the VON springs operate as previously described.

At the conclusion of the digit "0," the line relay is retained in its operating position, retaining operated the hold relay R230 and causing the transfer relay R250 to restore shortly thereafter. At this time the vertical wiper 211 is engaging the tenth contact, and when relay R250 finally restores to close ground at contacts 253 to the vertical wiper 211, it will be ineffective since conductor C214 is an open circuit by the fact that contacts 276 are open. Furthermore, since neither relays R270 nor R380 operate, when the slow-to-release relay R250 restores it closes at contacts 254 an error tone to the calling station for notification that an incorrect digit has been dialed. This error tone is transmitted from conductor C225, VON contacts 245, contacts 271, 388, 254 and back over the positive side of the line including conductor C202. Still further, since relay R270 did not operate, the prepared rotary circuit means opened at contacts 274, despite the closure of contacts 252 when the transfer relay R250 restores which normally controls the rotary circuit.

The calling subscriber at station TS, upon receipt of the error tone, will then have to hang up and make the call in the proper way, since further dialed digits would be ineffective except to pulse the line relay.

The above would of course hold true for any of the digits "3–9," if they were any of the first digits dialed into connector 200.

*Release*

Assuming that the subscriber TS disconnects on a busy condition of any of the preceding calls, the circuit to the line relay R220 is interrupted, causing this relay to restore and effecting restoration of the slow-to-release hold relay R230 shortly thereafter. Upon restoring, the hold relay R230 interrupts at the contacts 232 the circuit for applying ground potential to the control conductor C203 extending to the selector 110 whereby the selector 110 is released in a well-known manner, which in turn, releases the finder 105. The finder 105 upon releasing causes the line circuit 102 to mark the subscriber line 101 as idle to the selector 110, etc., having access thereto. Further, the release of relay R230 interrupts at contacts 231 the locking circuit to the testing relay R320. Also, upon restoring, the hold relay R230 interrupts at contacts 236 the circuits to relays R260 and R270, and the locking circuit to the wiper switch relay R380 if operated. Lastly, contacts 235 close to complete a circuit to the release magnet M219 via VON contacts 241. Upon energizing, the release magnet M219 releases the wiper carriage of Strowger mechanism 400 causing it to be returned into its normal rotary and vertical position. When the wiper carriage is released, the vertical off normal springs restore to normal, whereby VON contacts 242 close to connect battery potential by way of the upper winding of transfer relay R250 to the control conductor C203, and VON contacts 241 being interrupted to de-energize the release magnet M219. At this time, the connector 200 is completely released and available for use.

At the conclusion of any of the above described established connections, when the subscriber at the calling station TS disconnects, the loop circuit extending to the line relay R220 is interrupted causing the latter relay to restore and effect restoration of the hold relay R230 shortly thereafter, the latter relay being of the slow-to-release type. When the subscriber at any of the mentioned called stations disconnects, the loop circuit extending to the reverse battery relay R205 is interrupted causing the latter relay to restore. Upon restoring, the hold relay R230 completes at contacts 235 the previously described circuit to the release magnet M219. Also, upon restoring, the hold relay R230 interrupts at contacts 231 the holding circuit to the switch-through relay R370. Further, contacts 236 interrupts the circuits to relays R260, R270, R310, R370 and if operated, relay R380. Relays R260, R270 and R370 restore, the ring cut-off relay R310 restores shortly thereafter, this relay being of the slow-to-release type. Also, the wiper switch relay R380 will restore, if it was previously operated. When ground potential is removed from the control conductor C203, as a consequence of the restoration of the hold relay R230, the selector 110 is released to further release the preceding equipment, and the line circuit 102 is controlled to mark the subscriber line 101 as idle.

At this time, the connector 200 is completely released, the called line circuit or P.B.X trunk is released and controlled to mark their specific entrances as idle to the connector 200, etc., having access thereto.

Accordingly, at this time, the established connection between the calling subscriber TS and the called party is released and all of the apparatus involved therein is completely released and available for use.

Due to the above described arrangement, a telephone system is provided for accommodating, at a single connector a great variety of different kinds of subscriber service including individual line service, party line service and P.B.X trunk service including automatic P.B.X trunk hunting. Also, it is apparent that through the use of the ringing control system described different substations on the same party line may be selectively connected to different levels in the contact banks and may be connected particularly to unused contact sets on the P.B.X levels. Thus it may be that the directory numbers of individual stations on a party line need not be consecutive but be determined by the vacancies in the contact sets in the contact banks. The advantage of such an automatic telephone system include that it will provide a maximum of two hundred entrances to these various types of stations as needed and also provides for efficient use of switching equipment in such systems.

It is understood that the above-described embodiment is merely an illustration of the principles of the invention and that a person skilled in the art may devise other modifications and improvements without deviating from the spirit and scope of the invention.

What is claimed is:

1. In a telephone system, a calling station, a connector switch of the two motion type having a first and second plurality of levels of bank contact sets, means for extending an incoming connection from said calling station to said connector switch, a first wiper set having access to said first plurality of levels, a second wiper set having access to said second plurality of levels, a called party line commonly connected to certain bank contact sets on said first and second plurality of levels and adapted to serve a given number of stations, a signaling conductor, a given number of marking conductors respectively corresponding to said stations on said party line, means for applying in timed sequence in repeated cycles a given number of signals respectively corresponding to said stations to said signaling conductor and a marking potential to said marking conductors, whereby a particular signal is applied to said signaling conductor simultaneously with the application of said marking potential to the corresponding particular marking conductors, wiper determining means operated responsive to the receipt of a predetermined one of two dialed first digits from said calling station for determining which wiper set is to be effective for extending a connection to said called party line, stepping means responsive to the receipt of further dialed digits received from said calling station to simultaneously step both of said wiper sets to corresponding particular levels and bank contact sets respectively wherein only said determined wiper set connects said connector to said called line and selects a determined one of said marking conductors, and means responsive to the application of said marking potential to the selected one of said marking conductors for connecting said signaling conductor to said party line to selectively signal the corresponding one of said stations.

2. A telephone system as claimed in claim 1, including wiper releasing means for restoring said wiper sets to normal, and relay means operated in response to the receipt of said predetermined one of two dialed first digits for operating said releasing means to absorb said first dialed digit.

3. A telephone system as claimed in claim 2, including a control relay operated in response to the restoration of said wiper sets to restore said releasing means to normal and to render said releasing means ineffective, to restore said wiper sets upon receipt of any succeeding dialed digits.

4. A telephone system as claimed in claim 1, including wiper releasing means, a circuit for said wiper releasing means for restoring said wiper set to normal, and relay means operated in response to the receipt of said predetermined one of two dialed first digits for completing said circuit to said releasing means in order to absorb said first dialed digit.

5. A telephone system as claimed in claim 4, including a control relay operated in response to the restoration of said wiper sets to open said circuit for said releasing means in order to render said releasing means ineffective to restore said wiper sets in response to the receipt of any succeeding dialed digits.

6. A telephone system as claimed in claim 1, including a source of error tone, and transfer means effected by the receipt of any first dialed digit other than either of said predetermined one of two dialed first digits for connecting said error tone source to said incoming connection for transmission and notification thereof of an incorrect dialed digit to the calling station.

7. A telephone system comprising a calling line, a plurality of trunk lines including therein a group of trunk lines serving an operator position station, each of said lines being provided with a pair of line conductors and a control conductor, said control conductor carrying thereon an indication of the idle or busy condition of the corresponding line, a connector switch including two wiper sets and a plurality of corresponding separate levels of bank contact sets for separate engagement by each wiper set respectively, a pair of first levels of consecutive contact sets mutually corresponding to each separate plurality of levels of bank contacts respectively terminating said groups of trunk lines and contact sets in other levels respectively terminating the other of said trunk lines, each of said contact sets including a pair of line contacts and a first control contact respectively terminating the pair of line conductors and the control conductor of the corresponding line, in said first pair of levels the ones of said consecutive contact sets other than the last one thereof each including a second control contact connected to the control conductor of the corresponding trunk line, a wiper motor for driving said wiper sets over the contact sets in their respective levels, selective means operative for selecting which wiper set is to be effective upon engagement of contact sets in said corresponding levels, said selective means including an auxiliary wiper and vertical bank contacts whereby said auxiliary wiper is driven by said wiper motor to engage a vertical bank contact corresponding to a level on said bank contact levels, a level relay operated in response jointly to the operation of said auxiliary wiper and to the selection of a one of said contacts in said pair of levels, a test relay operative from the first control contact of the selected contact set corresponding to the wiper set selected and operated in response to the busy condition of the connected trunk line, and a control relay rendered operative in response jointly to the operation of said level relay and said test relay and operated thereafter from the second control contact in said selected contact set in response to a busy condition indication thereat for operating said wiper motor, whereby said wiper sets are stepped into engagement with the next consecutive contact sets in their said pair of levels respectively.

8. A telephone system as claimed in claim 7, including a source of error tone, and means effected by a failure of said selective means to operate upon said auxiliary wiper engaging certain vertical bank contacts for connecting said error tone to said calling line.

9. In a telephone system, a calling station, a connector switch of the two motion type having a first and a second plurality of levels of bank contact sets, means for extending an incoming connection from said calling station to said connector switch, a first wiper set having access only to said first plurality of levels of bank contact sets, a second wiper set having access only to said second plurality of levels of bank contact sets, an auxiliary wiper and a vertical bank of contacts, a first level on said first plurality of levels having P.B.X trunks successively connected to bank contact sets thereon associated with a single P.B.X switchboard, a first level on said second plurality of levels having P.B.X trunks successively connected to bank contact sets thereon associated with said single P.B.X switchboard, stepping means operative responsive to the receipt of dialed digital impulses from said calling station for simultaneously stepping said wiper sets and said auxiliary wiper, a first circuit means controlled over a first vertical bank contact for selecting said first wiper set for extending a connection responsive to the receipt of a first dialed digit of a first predetermined value, a second circuit means controlled over a second vertical bank contact for selecting said second wiper set for extending a connection responsive to the receipt of a first dialed digit of a second predetermined value, releasing means operative to release said wiper sets and said auxiliary wiper subsequent to the selection of the wiper set for extending the connection, a self-interrupter circuit for self-interruptedly stepping said wiper sets over said first levels and bank contact sets to engage an idle one of said P.B.X trunks, a level relay, a third circuit means controlled over a third vertical bank contact for operating said level relay responsive to the receipt of a second dialed digit of a third predetermined value, and means operative to close said self-interrupter circuit responsive to the operation of said level relay in combination with the termination of a subsequent dialed digit for extending a connection to said P.B.X switchboard via said engaged idle P.B.X trunk.

10. A telephone system as claimed in claim 9, including a source of error tone, and means operated responsive to the receipt of a first dialed digit other than said first dialed digit of said first and second predetermined value for connecting said error tone to said incoming connection to notify said calling station of an incorrect dialed digit.

No references cited.